United States Patent [19]
Shiozaki et al.

[11] Patent Number: 5,869,941
[45] Date of Patent: Feb. 9, 1999

[54] AIR BREAKING TYPE MACHINE TOOL

[75] Inventors: Mashahito Shiozaki, Shizuoka-ken; Takeshi Momochi, Numazu; Kazuo Nagashima, Shizuoka-ken, all of Japan

[73] Assignee: Toshiba Kikai Kabushiki Kaisha, Tokyo, Japan

[21] Appl. No.: 785,595

[22] Filed: Jan. 17, 1997

[30] Foreign Application Priority Data

Jan. 18, 1996 [JP] Japan .................................... 8-006401

[51] Int. Cl.⁶ .............................. B23Q 5/10; F16C 32/06
[52] U.S. Cl. ........................ 318/481; 318/632; 318/340; 318/616; 73/118.1; 73/138
[58] Field of Search .................... 318/560–696; 310/90; 384/118, 114, 107, 100, 113, 115, 292, 909, 120; 73/535, 577 R; 239/703, 223, 700; 409/163, 233; 101/348, 148, DIG. 38

[56] References Cited

U.S. PATENT DOCUMENTS

| | | | |
|---|---|---|---|
| 3,900,952 | 8/1975 | Landgraf et al. | 310/154 |
| 4,084,428 | 4/1978 | Ahn et al. | 73/117.3 |
| 4,221,995 | 9/1980 | Barkman | 318/616 |
| 4,250,741 | 2/1981 | Sciven et al. | 73/64.4 |
| 4,445,793 | 5/1984 | Shinohara | 384/130 |
| 4,566,324 | 1/1986 | Vinogradov et al. | 73/60 |
| 4,790,971 | 12/1988 | Brown et al. | 364/138 |
| 4,848,174 | 7/1989 | Brown et al. | 74/89.15 |
| 4,882,836 | 11/1989 | Higuchi | 29/719 |
| 4,882,837 | 11/1989 | Higuchi | 29/719 |
| 4,884,329 | 12/1989 | Higuchi | 29/407 |
| 4,930,907 | 6/1990 | Smith | 384/118 |
| 5,019,738 | 5/1991 | Weilbach et al. | 310/90.5 |
| 5,062,362 | 11/1991 | Kemp | 101/348 |
| 5,078,558 | 1/1992 | Arai et al. | 409/233 |
| 5,108,236 | 4/1992 | Arai et al. | 409/163 |
| 5,110,520 | 5/1992 | Miyazaki et al. | 264/40.3 |
| 5,181,783 | 1/1993 | Sherman et al. | 384/114 |
| 5,203,204 | 4/1993 | Miyazaki et al. | 73/118.1 |
| 5,271,677 | 12/1993 | Sherman et al. | 384/114 |
| 5,294,071 | 3/1994 | Hartel et al. | 424/150 |
| 5,328,270 | 7/1994 | Crawford et al. | 384/100 |
| 5,346,139 | 9/1994 | Davis et al. | 239/703 |
| 5,353,642 | 10/1994 | Hasegawa et al. | 73/535 |
| 5,533,813 | 7/1996 | Makino et al. | 384/115 |
| 5,675,200 | 10/1997 | Hayashi | 310/90 |

*Primary Examiner*—Paul Ip
*Attorney, Agent, or Firm*—Finnegan, Henderson, Farabow, Garrett & Dunner, L.L.P.

[57] ABSTRACT

The present invention provides an air bearing type machine tool capable of carrying out a process with a high load for cutting iron or the like and controlling the degree air is used. The air bearing type machine tool includes a main shaft, an air bearing supporting the main shaft, and an air pressure regulating device capable of regulating the pressure of air supplied to the air bearing. The air pressure regulating device, in turn, has an air feed portion supplying air to the air bearing, a processing load detection device for detecting the degree of processing load, a processing power detection device for detecting the degree of processing power, and an air pressure defining device for controlling the pressure of air fed from the air feed portion by using the detected values of the processing load and the processing power. The pressure of air supplied to the air bearing can be changed, so that the rigidity of the air baring can be changed in response to the processing load or the like, that is the process with from the low load to the high load can be carried out, with the result that the used air can be controlled at the minimal required amount.

11 Claims, 4 Drawing Sheets

AIR BREAKING TYPE MACHINE TOOL

BACKGROUND OF THE INVENTION

1. Field of the Invention

This invention relates to an air bearing type machine tool to support a main shaft by an air bearing, which is for carrying out a cutting process of various materials, such as steel, iron, non-ferrous metal, wood, stone, glass, graphite, plastic, ceramic and so on.

2. Description of the Related Art

In a typical machine tool for carrying out a cutting process or the like, a main shaft attached thereto with a tool is generally supported by an antifriction bearing. In some machine tools, an oil bearing of dynamic pressure or static pressure is used as a bearing for the main shaft.

Further, lately, there has been an ultra-precise machine using a static air bearing having extremely low-friction as the bearing for the main shaft.

However, the aforementioned conventional bearings have the following disadvantages.

More specifically, when the antifriction bearing is used as the bearing for the main shaft, the product of the rotational number and the diameter of orbit of which a rolling element is rotated is limited to a fixed threshold value dependent upon a structure of the bearing or the like, so that there is a disadvantage that it is difficult to rotate the main shaft at high-speeds. Therefore, the rotational speed of the main shaft is slower, resulting in a disadvantage that it is difficult to shorten the processing time.

Incidentally, lately, the structure of the bearing has been developed to pave the road to rotate the main shaft at high speeds by various inventions even when the antifriction bearing is used, but there are disadvantages that a vibration and noise are large and the life of the main shaft or the bearing is shorter. Especially, the short life causes the need for a routine replacement of the main shaft or the bearing in order to maintain production, resulting in a disadvantage of the extremely great cost of processing including replacement costs in the great-efficient high-speed process to rotate the main shaft at high speeds.

The antifriction bearing cannot basically avoid producing a vibration by microscopic asperities on the transferring face or a sphericity error of each rolling element, resulting in a basic disadvantage that it is difficult to improve the processing accuracy and to carry out the process in high speeds.

In the oil bearing of the dynamic pressure or the static pressure, when the main shaft is rotated at high speed, the sharing resistance of oil is increased, resulting in an uneconomical disadvantage caused by increasing power consumption.

Heat, caused by increasing power consumption produces, thermal deformation of the main shaft or the bearing, resulting in a disadvantage of reduction of the processing accuracy.

In the conventional static air bearing, a supplied air pressure is approximate 5 atmospheric pressure to 7 atmospheric pressure, the rigidity of the bearing is insufficient for processing iron, steel or the like which needs high load, therefore the bearing cannot be used except for precisely processing for soft metal, such as bronze, aluminium, silicone or the like.

The applicants have been developed a machine tool capable of processing for iron, steel or the like which needs high load by improving the rigidity of the bearing by increasing the pressure of air supplied to the static air bearing, but newly found an uneconomical disadvantage of using high amounts of energy because an amount of air used is increased as the air pressure is increased.

It is an object of the present invention to provide the air bearing type machine tool capable of processing for cutting iron or steel or the like which needs high load, and saving energy by controlling an amount of air used.

SUMMARY OF THE INVENTION

An air bearing type machine tool according to the present invention is characterized by including a main shaft; an air bearing supporting the main shaft; and an air pressure regulating device for regulating pressure of air supplied to the air bearing, in which the pressure of air supplied to the air bearing is regulated during processing operation.

In the present invention as described above, by changing the pressure of air supplied to the air bearing in the air pressure regulating device, the rigidity of the air bearing is regulated. Therefore, even when the degree of processing load is changed by a processed object or a processing method, the rigidity of the bearing can be changed to coordinate with the changed degree of processing load, so that the required rigidity can be added to the bearing in response to various processed objects wood, soft metal such as bronze or the like, metal processed with the high load because of a high hardness, such as iron, steel or the like, and so on, resulting in possibility of processing under the high load with the use of the air bearing.

The pressure of air supplied to the air bearing can be regulated during the processing operate, so that the pressure of air supplied can be reduced in the case the rigidity of the bearing can be defined to be low, therefore, air is not wasted when the pressure of air is controlled at the minimal required amount, resulting in a saving of energy and reduction of processing costs.

Here, it is advisable that the air pressure regulating device has a processing load detection device for detecting the degree of processing load, and an air pressure defining means for defining the pressure of air supplied to the air bearing in response to the degree of processing load detected by the processing load detection device.

According to the aforementioned structure, in response to the degree of processing load detected in the processing load detection device, the air pressure can be defined in the air pressure defining device, so that the rigidity of the air bearing can be automatically regulated in response to the processing load, resulting in the optimally regulated rigidity to coordinate with the processing load.

It is advisable that the air pressure regulating means has a processing power detection means for detecting the degree of processing power when the main shaft is rotated for processing as well as the processing load detection device, so that the air pressure defining means defines the pressure of air supplied to the air bearing based on the degree of load detected by the processing load detection device and the degree of power detected by the processing power detection device.

In addition to the processing load, the processing power is detected as described above, thereby the pressure of air supplied to the air bearing can be further small controlled.

The air pressure regulating device may be structured to have a target value defining device for previously defining a supplied air-pressure target value to coordinate with a process programming, and an air pressure defining means for defining pressure of air supplied the air bearing based on the target value defined by the target value defining device.

In the aforementioned structure, the pressure of air supplied to the air bearing can be changed to coordinate with the process programming, so that the rigidity of the air bearing can be regulated without the detection device for detecting the processing load or the processing power.

The air bearing type machine tool according to the present invention may be characterized by including a main shaft; an air bearing supporting the main shaft; a motor rotating the main shaft; a driving system driving the motor; a numerical control system controlling the driving system; and an air feed portion supplying air to the air bearing, in which the numerical control system is provided with an air pressure defining device for defining the pressure of air supplied from the air feed portion to the air bearing.

In the invention as described above, the processing operation is carried out to control the driving system by the NC system to drive the motor so as to rotate the main shaft while air is supplied from the air feed portion to the air bearing supporting the main shaft. The air pressure defining device defines and controls the pressure of air supplied from the air feed portion to the air bearing in response to the degree of processing load, the target value previously defined, or the like. Therefore, even when the degree of processing load is changed by the processed object or the processing method, the rigidity of the air bearing can be regulated to coordinate with the changed degree of processing load, so that the air pressure is not needed to be increased by exceeding necessity in order to improve the rigidity, resulting in a saving of energy and reduction of processing costs.

DETAILED DESCRIPTION OF THE PREFERRED EMBODIMENT(S)

The preferred embodiment according to the present invention will be explained below with reference to the attached drawings.

Figure 1:
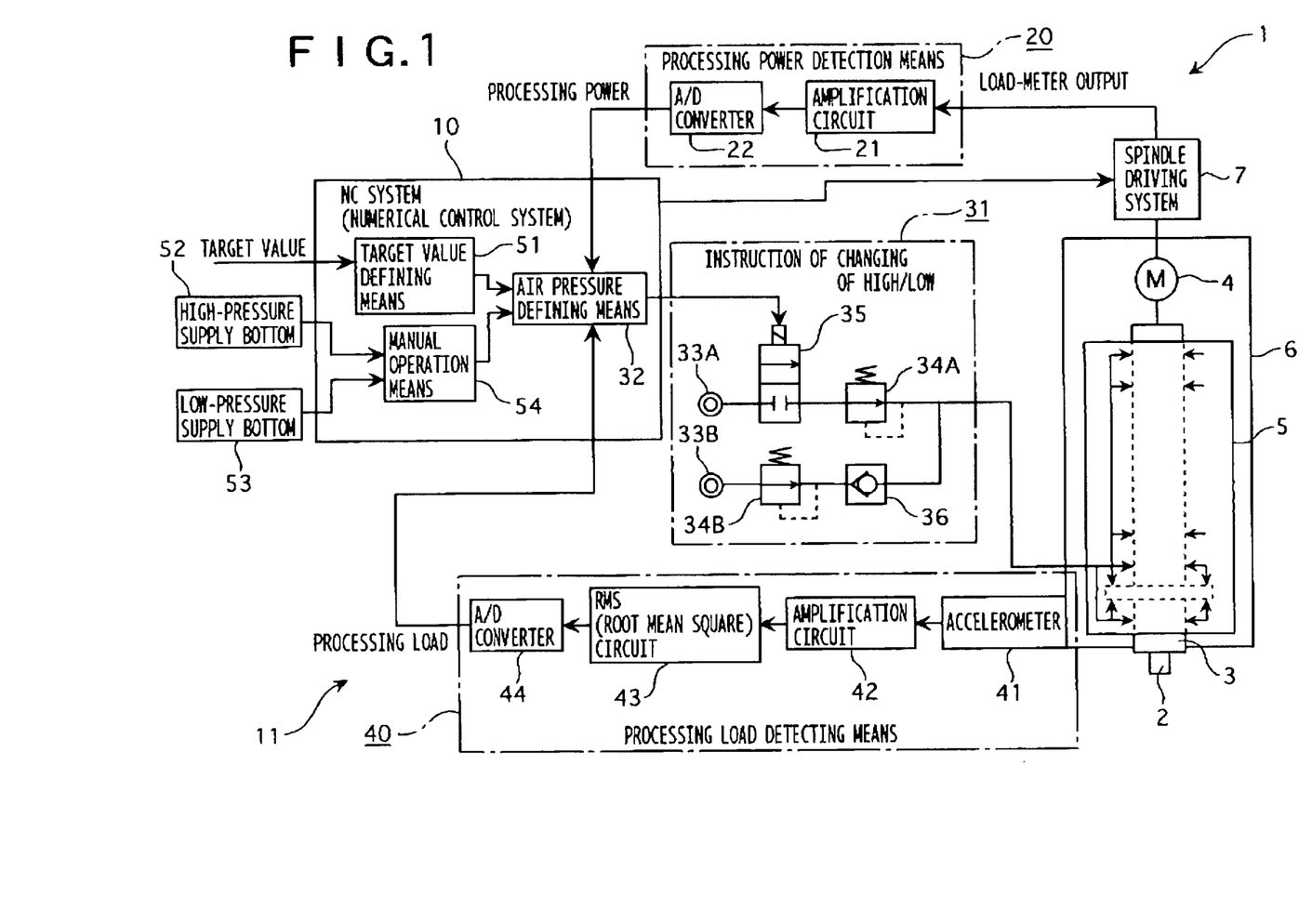
FIG. 1 is a block diagrammatic view showing a machine tool of an air bearing type according to the preferred embodiment of the present invention.

FIG. 1 shows a block diagrammatic view of a machine tool of an air bearing type 1 for carrying out milling, which is applied in the embodiment. The machine tool 1 is composed of a main shaft (spindle) 3 fitted thereto with a tool 2, such as a drill, an end mill or the like, a motor 4 rotating the main shaft 3, an air bearing 5 supporting the main shaft 3, and a housing 6 containing the main shaft 3, the motor 4 and the air bearing 5.

The motor 4 is connected to a spindle driving system 7 driving the motor 4. The spindle driving system 7 is controlled by a NC system (a numerical control system) 10. Further, the spindle driving system 7 is coupled to a processing power detection means 20 for detecting a processing power value (a load power value) by using a load-meter output of the spindle driving system 7 and outputting the detected value to the NC system 10.

The air bearing 5 is connected to an air supply portion 31 supplying air to the air bearing 5. The housing 6 is connected to a processing load detection device 40 for detecting a processing load (a cutting load) by detecting vibration of the housing 6.

An air pressure regulating device 11 is composed of the processing power detection device 20, the air supply portion 31, the processing load detection 40 and an air pressure defining device 32, placed in the NC system 10, for defining a pressure of the air supplied from the air supply portion 31 to the air bearing 5.

The processing power detection device 20 includes an amplification circuit 21 amplifying the load-meter output (voltage) of the spindle driving system 7 and an A/D converter 22 converting the amplified voltage (an analog signal) into a digital signal in which the digital signal output caused by the AID converter 22 is inputted to the NC system 10.

The air supply portion 31 is composed of two air sources 33A and 33B for a higher pressure (the first pressure) and a lower pressure (the second pressure lower than the first pressure), pressure regulators 34A and 34B regulating the pressure of air supplied from each of the air sources 33A and 33B to be a specified value, a solenoid valve 35 provided to the side locating the air source for high-pressure 33A to intermit to be supplied with air from the air source for high-pressure 33A, and a check valve 36 provided to the side locating the air source for low-pressure 33B to be closed by the pressure when air is supplied from the air source for high-pressure 33A by opening the solenoid valve 35 and to be opened by the pressure of the air source for low-pressure 33B on its own when the solenoid valve 35 is closed.

The air pressure defining device 32 controls the driving of the aforementioned solenoid valve 35 to switch the air source, in which air is supplied to the air bearing 5, one of the air source for high-pressure 33A and the air source for low-pressure 33B, thereby the air pressure of the air bearing 5 is defined by switching back and forth between, for example, the low pressure of 5–6 kgf/cm$^2$ and the high pressure of 8–15 kgf/cm$^2$.

The processing load detection means 40 includes an accelerometer 41 attached to the housing 6, an amplification circuit 42 amplifying an output signal from the accelerometer 41, a RMS (root mean square) circuit 43 in which the average value of the output value of the amplification circuit 42 within a fixed time is found and the found average value is squared to find the square root, and an A/D converter 44 changing the output value of the RMS circuit 43 into a digital signal, in which the digital signal output of the A/D converter 44 is inputted to the NC system 10.

The air pressure defining device 32 is structured to moved by three operation modes; ① a first automatic control mode defined so that the air pressure defining device 32 controls the solenoid valve 35 based on the processing power and processing load data which are detected by the processing power detection device 20 and the processing load detection device 40 respectively, ② a second automatic control mode defined so that the air pressure defining device 32 controls the solenoid valve 35 based on a supplied air pressure target value send from a target value defining means 51 in which an air pressure program, defined to coordinate with a process programming, or development of the processing operation, is registered in the target value defining device 51 located in the NC system 10 as the supplied air-pressure target value, and ③ a manual mode defined so that the air pressure defining device 32 controls the solenoid valve 35 based on a signal outputted from a manual operation device 54 receiving the operations from a high-pressure supply bottom 52 and a low-pressure supply bottom 53 which are placed in the NC system 10.

A specific structural example of the air bearing 5 will be below with reference to FIG. 2.

The housing 6 is comprised of a cylindrical bearing body sleeve 61, a driving motor sleeve 62 located to the upper side of the sleeve 61, a cover 63 closing the upper opening of the sleeve 62, and a cover 65 located to the lower side of the sleeve 61 through a spacer.

Incidentally, on the outer circumference of the bearing body sleeve 61 and the driving motor sleeve 62, respectively, a water-jacket for cooling the bearing of the body 66 and a water-jacket for cooling the driving motor 67 are attached.

In the driving motor sleeve 62, the motor 4, composed of a rotated portion 4A coupled with the main shaft 3 and a fixed portion 4B located on the outer circumference of the rotated portion 4A, is provided. The motor 4 is controlled and driven by the aforementioned spindle driving system 7.

In the bearing body sleeve 61, three bearing members 71, 72 and 73 are placed.

The bearing member 71 placed to the upper side adjacent to the motor 4 and the bearing member 72 located between the bearing members 71 and 73 are, in turn, formed therein with plural air outlets 74 which blasts air in an axial orthogonal direction toward the main shaft 3 from two position formed to each of the bearing members 71 and 72 in the longitudinal direction. The bearing member 73 placed to the lower side is formed therein with plural air outlets 74 which blasts air toward the main shaft 3 from a position in the longitudinal direction.

Air blasted from each air outlet 74 forms a radial bearing to support the main shaft 3 in a radial direction.

A flange 3A is formed to the lower side of the main shaft 3, in which air outlets 75 are formed to blast air toward the flange 3A air blasted from the air outlets 75 forms a thrust bearing to support the main shaft 3 in a thrust direction.

Each of the air outlets 74 and 75 is communicated with an air supply canal 76 formed in the sleeve 61, in which air defined at the high pressure or the low pressure is supplied from the air feed portion 31 coupled with a compressed air inlet 76A of the air supply canal 76. The end of the air supply canal 76 is closed with a cover member 76B so as not to leak air toward the sleeve 62.

The bearing body sleeve 61 is formed with an air-exhaust canal 77 which is communicated with an air-exhaust hole 78 formed at the intermediate portion between the bearing members 71 and 72 and an air-exhaust hole 79 formed to the spacer placed to the flange 3A of the main shaft 3.

An operation when the first automatic working mode is selected in the machine tool 1 shown in FIGS. 1 and 2 will be described below with reference to a flow chart of FIG. 3.

First, each air pressure of the high presser and the low pressure is defined by controlling the pressure regulators 34A and 34B of the air feed portion 31. The pressure value may be defined in consideration of a processed object, a processing method and a kind of the tool 2, for example, the high pressure may be defined as a pressure of 15 kgh/cm$^2$ and the low pressure may be defined as a pressure of 6 kgh/cm$^2$.

And, the main shaft 3 is driven so that the spindle driving system 7 is controlled by the NC system 10. At this time, the solenoid valve 35 is closed by the air pressure defining device 32, so that air of the low pressure is supplied into the air bearing 5 in the initial stage.

Starting the process, the processing load detection device 40 measures a processing load (a vibratory value) and sends the measured data to the air pressure defining device 32 (Step 1: Step will be abbreviated as "S" below).

The air pressure defining device 32 determines which the send processing load data are within a defined range (in a middle position), larger than the defined range or smaller than the defined range (S 2).

Here, when the processing load data are larger than the defined range, or when the vibration of the housing 6 is larger, a necessity to define the air pressure supplied into the air bearing 5 as the high pressure is appeared on a display of the NC system 10 (S 3).

Provided that the necessity to defined the supplied pressure as the high pressure is determined, it is determined whether the operation mode is selected irom the first automatic mode or the manual mode (S 4), and a high-pressure instruction signal is outputted in the automatic mode to change the fed air into the high pressure by opening the solenoid valve 35 of the air feed portion 31 (S 5).

When the operation mode is the manual mode (S 4), the air pressure defining device 32 does not automatically operate and maintains the initial stale without changing the supplied air pressure insofar as an operator does not push the high-pressure supply bottom 52 or the low-pressure supply bottom 53.

When the processing load is within the defined range (the middle) or is smaller than the defined range (small), the processing power detected by the processing power detection device 20 is referred (S 6).

It is determined which the processing power data are within the defined range (a defined range), larger than the defined range or smaller than the defined range (S 7).

Here, when the processing power data are larger than the defined range, as in the case when the processing load data are larger, the display for the high pressure (S 3), the determination of the operation mode (S 4), the change to the high pressure (S 5) and so on are carried out.

When the processing power data are in the middle position, the appearance on the display of the NC system 10 is disappeared (S 8), and the state is maintained as it is without the change of the supplied air pressure.

When the processing power data are smaller, in the case that the degree of processing load is in the middle position (S 9), the appearance on the display of the NC system 10 is disappeared (S 8), the state is maintained as it is without the change of the supplied air pressure.

But in the case that the degree of processing load is small (S 9), namely, in the case that the vibration is not produced and the power is small the air pressure supplied into the air bearing 5 is allowed to be the low pressure, so that the low pressure is appeared on the display of the NC system 10 (S 10).

Further, it is determined whether the operation mode is the automatic mode or the manual mode (S 11), and the low-pressure instruction signal is outputted in the automatic mode to change the supplied air to the low pressure by closing the solenoid valve 35 of the air feed portion 31 (S 12).

When the operation mode is the manual mode (S 11), as described above, the state is maintained as it is without the change of the supplied air pressure insofar as the operator does not push the high-pressure supply bottom 52 or the low-pressure supply bottom 53.

Next, it is determined whether the machine tool 1 is interrupted or operated (S 13), and when the machine tool 1 is not interrupted, the aforementioned processes are repeated to change as necessary the pressure of the air supplied to the air bearing 5 in the two stages of the high pressure and the low pressure in dependence on the change of the processing load or the processing power. When the machine tool 1 is interrupted, the pressure regulating process is also finished.

When the operation mode is the manual mode, based on the processing state, the rotating state of the main shaft 3 and the displays of the high pressure or the low pressure of the NC system 10, the operator can press the high-pressure supply bottom 52 or the low-pressure supply bottom 53 located to the NC system 10 at the discretion of the operator. When the manual operation device 54 detects that one of the bottoms 52 and 53 is pushed, the signal for changing to the high pressure or the low pressure is send to the air pressure defining device 32, and the air pressure defining device 32 operates the solenoid valve 35 based on the send signal, thereby the air pressure supplied to the air bearing 5 is regulated.

In the case that the operation mode is the second automatic mode using the target value defining device 51, the supplied air-pressure target value is previously defined and stored in the target value defining device 51 to coordinate with the process programming so that the supplied air pressure becomes higher when the load is larger and the becomes lower when the load is smaller. The pressure target value is timely send to the air pressure defining device 32 to coordinate with the moving stage of the process programming, thereby the air pressure defining device 32 causes the solenoid valve 35 to operate by using the send target value so as to regulate the pressure of air supplied to the air bearing 5.

Therefore, the air pressure regulating device 11 of the embodiment is composed of the target value defining device 51, the high-pressure supply bottom 52, the low-pressure supply bottom 53 and the manual operation means 54 as well as the processing power detection device 20, the air feed portion 31, the air pressure defining device 32 and the processing load detection device 40.

According to the embodiment, the following effects will be listed.

More specifically, the air pressure regulating means 11 is provided, so that the pressure of air supplied from the air feed portion 31 to the air bearing 5 can be automatically changed at the two stages of the low pressure and the high pressure even when the processing load and the processing power are changed.

Therefore, even when the degree of processing load is changed by a processed object or a processing method, the rigidity of the air bearing 5 can be changed in response to the changed degree of processing load, so that the necessary rigidity can be added to the bearing 5 in response to each process object from wood or soft metal, such as bronze or the like, to metal necessary to add the high load, such as iron, steel or the like, resulting in the achievement of the process for the high load with the use of the air bearing 5.

From the fact that the pressure of air supplied to the air bearing 5 can be regulated during the processing operation, when the rigidity of the air bearing 5 is low, namely, when the processing load or the processing power is small, the supplied air pressure is automatically changed to the low pressure, so that air is not wasted, resulting in a saving of energy and reduction of processing costs.

Further, the rigidity of the air bearing 5 can be changed in response to the change of the processing load, so that the rigidity of the bearing can be regulated to coordinate with the change of increasing the processing load, with the result that the main shaft 3 can be prevented from damage and the machine tool 1 can be stably operated.

The static air bearing 5 does not have a part of relatively moving by contact of metals with one another in principle, so that the following various effects are obtained: ① it is possible to successively rotate at high-speeds for long time, ② the life of the bearing can be longer than an antifriction bearing, ③ the used energy can be controlled to be low, ④ the precision of the rotation at the high-speeds is improved, ⑤ the levels of a vibration and noise are low, ⑥ thermal deformation can be controlled to be small because of low heating, ⑦ it is unnecessary to warm up the bearing for longer time than the antifriction bearing, and ⑧ the sufficient dynamic rigidity for processing a material having high hardness can be obtained.

Especially, in the static air bearing 5, even if a slight roundness error occurs in the shaft or the bearing, the average value of the roundness error exerts an influence upon the flow of air as working fluid, so that the roundness error is not to be a direct cause of producing a vibration, therefore the extremely quiet rotation can be obtained and the levels of a vibration and noise can be controlled to be low.

When the milling or the like of the high-load process are carried out with the machine tool using the conventional antifriction bearing, in order to improve the efficiency, three kinds of tools for roughing, semi finish and finishing are generally used in order, in the embodiment, however, the rotational speed of the main shaft 3 can be increased as compared with the antifriction bearing by using the air bearing 5, therefore, even when the tool 2 for finishing having the lower degree of cutting is used, the lower degree of cutting can be compensated by rotating the main shaft 3 at the high-speeds, that is to say, the process can be carried out with only one kind of the tool 2.

One kind of the used tool 2 causes a process of changing the tool 2 to be unnecessary, with the result that the number of processes and time for working can be shortened and processing costs can be greatly reduced.

Furthermore, if the number of tools 2 is fewer, a path for the tools can be simplified, so that the number of NC programs which is needed to be formed in response to each tool can be fewer and the load of CAM is lighter.

Figure 2:
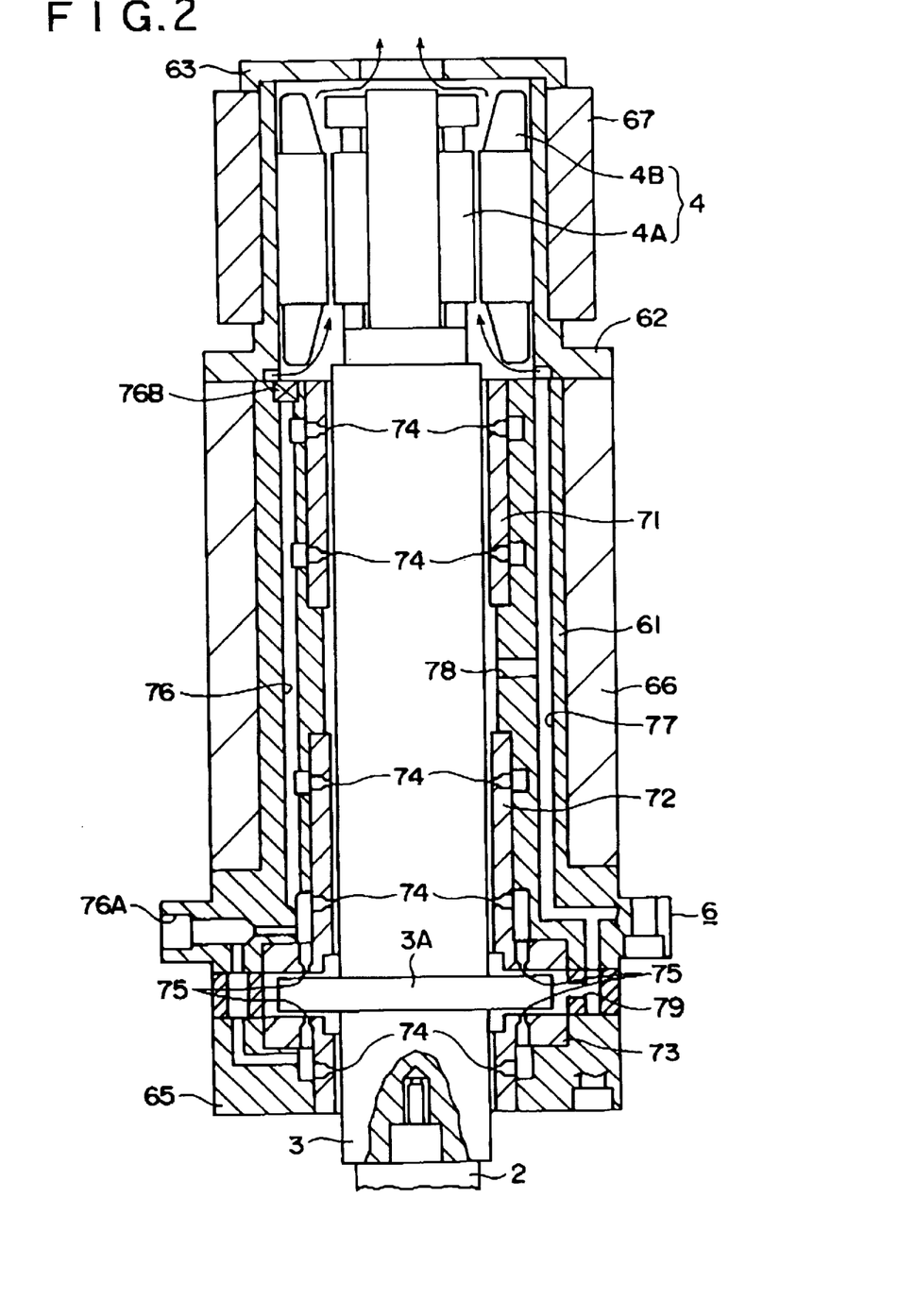
FIG. 2 is a sectional view showing a structure of a bearing portion of the machine tool of the air bearing type of the aforementioned embodiment.
Figure 3:
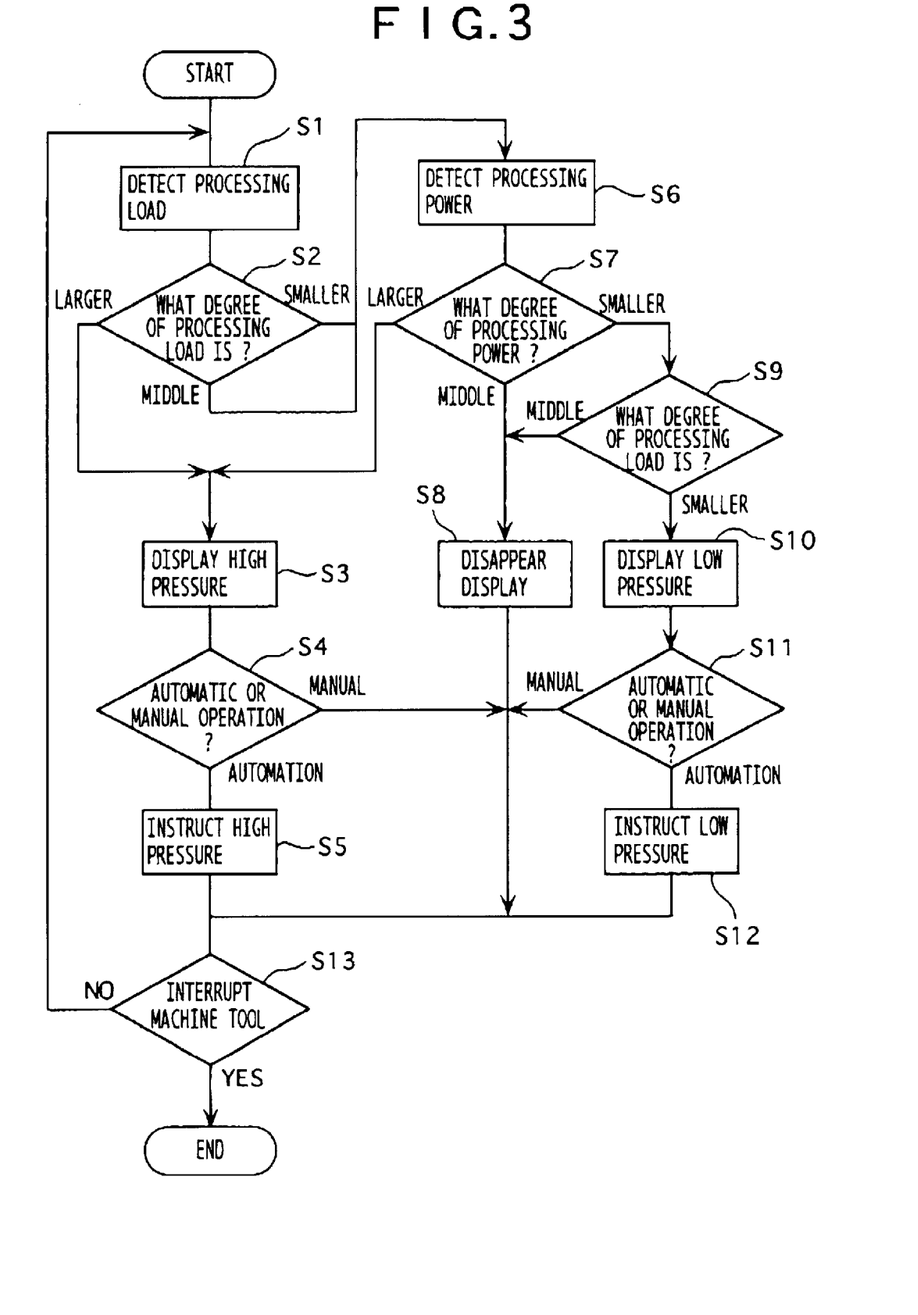
FIG. 3 is a flow chart explaining an operation of the machine tool of the air bearing type of the aforementioned embodiment.

In the embodiment shown in FIG. 2, the flange 3A of the main shaft 3 is located adjacent to the tool 2 to locate the thrust bearing toward the tool 2, therefore, if heat caused by processing is added to the main shaft 3, the degree of the thermal deformation in the thrust bearing can be lower because the length to the thrust bearing is short, so that an influence of heating can be fewer, resulting in the process with pinpoint accuracy.

As the air pressure regulating device 11, the first and second automatic modes and the manual mode are provided, so that, for example, the manual mode can be selected in the case of a trial process and the first or second mode can be selected in the case of the process repeated to some extent, resulting in the efficient processing work caused by selecting mode according to the circumstances.

The two air sources 33A and 33B for the high pressure and the low pressure are provided in the air feed portion 31, so that the concrete pressure of the high pressure and the low pressure can be easily defined and be defined not to interfere with one another, with the result that the optimum pressure can be defined in response to the processed object or the like.

As the processing load detection device 40, the accelerometer 40 is used, so that the structure of the processing load detection means 40 can be simple and a smaller size easily and a cost can be reduced.

The present invention is not intended to be limited to the aforementioned embodiment, and modifications is made therein without departing from the scope of achieving the object of the present invention.

Figure 4:
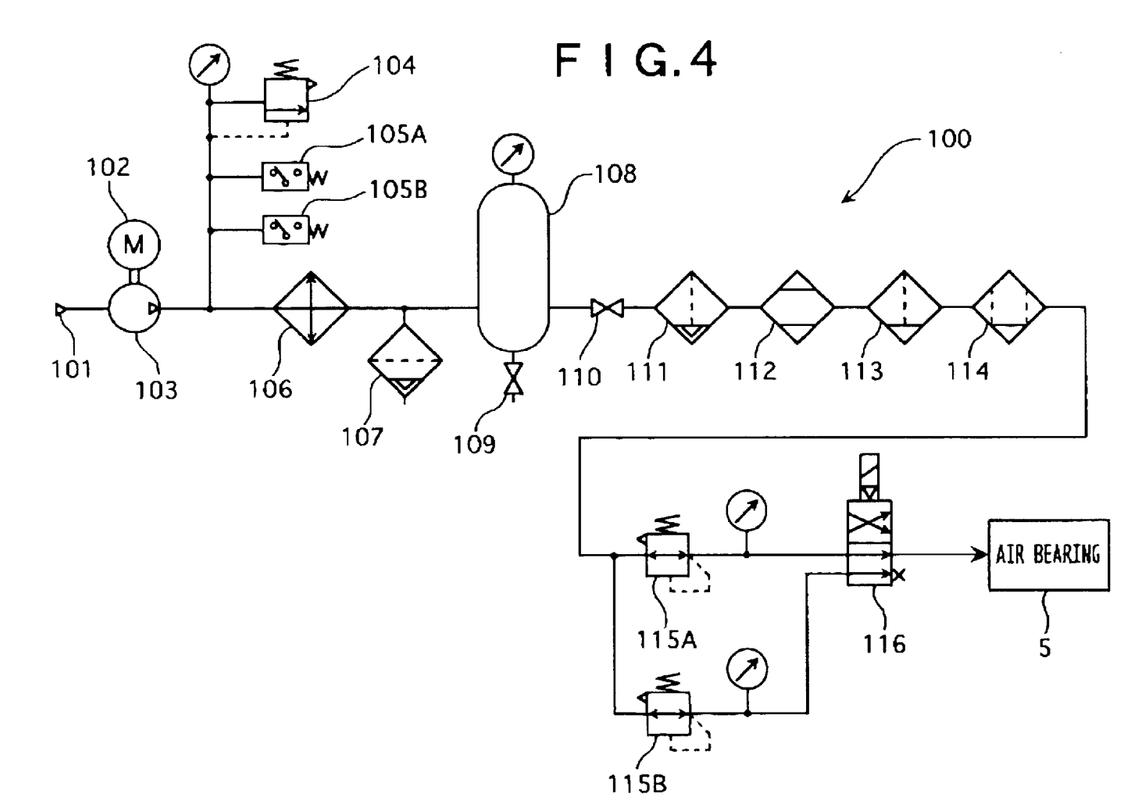
FIG. 4 is a block diagram showing an air supply portion in the machine tool of the air bearing type of another embodinent according to the present invention.

For example, in the aforementioned embodiment, the air feed portion 31, provided therein with the two air sources 33A and 33B for the high pressure and the low pressure, is used, but an air feed portion 100, defining the air pressure at two stages of the high and low pressures by changing the degree that the pressure is decreased of air supplied from one air source, may be used as shown in FIG. 4.

The air feed portion 100 includes an air compressor (an oil-free type screw compressor) 103 driven by a motor 102 and drawing and compressing air through an air drawing filter 101. In the low-stream side of the air compressor 103, a relief valve (a safety valve) 104, which works when the pressure in the air feed portion 100 exceeds a defined pressure (e.g., 11 kgf/cm$^2$), a pressurization switch for detecting high-pressure 105A, which detects whether the pressure in the system is higher than a defined pressure (e.g., 10 kgf/cm$^2$) or not and sending a signal for interrupting the air compressor 103 when the pressure exceeds the defined pressure, and a pressurization switch for detecting low-pressure 105B, which detects whether the pressure in the system is lower than a defined pressure (e.g., 9 kgf/cm$^2$) or not and sending a signal for starting the operation of the air compressor 103 when the pressure is lower than the defined pressure, are provided.

In the lower-stream side of the relief valve 104 and the pressurization switches 105A and 105B, an after-cooler 106, an automatic water trap (auto-drain) 107, a surge-tank 108 having a manual stop valve for releasing pressure 109, a manual stop valve for opening circuit of pressure 110, a first air filter with drain 111, an air dryer 112, a second air filter 113, and a micro-mist separator 114 are placed in order.

The low-stream side of the micro-mist separator 114 is split into two flows, in each flow, a regulator 115A defining the pressure of air supplied from the air compressor 103 to be high pressure (e.g., 8 kgf.cm$^2$) and a regulator 115B defining the supplied air pressure to be low pressure (e.g., 6 kgf.cm$^2$) are placed.

Each split flow is connected to an electromagnetic valve for changing circuits 116, in which one of the high pressure and the low pressure is changed to be connected to the air bearing 5 by operating the electromagnetic valve 116.

In the case of the use of the air feed portion 100 as described above, the pressure of air supplied to the air bearing 5 can be changed at two stages and the rigidity of the air bearing 5 can be controlled in response to the processing load, therefore, the same effects as the aforementioned embodiment can be obtained. The number of air source may be one and each number of air compressor 103 and the like may be one, resulting in cheaper spending on equipment as compared with the case two air sources are provided. In the case of one air source, however, the difference between the high pressure and the low pressure cannot be defined to be large, so that it is advisable that two air sources 33A and 33B as the aforementioned embodiment are provided when the large difference of pressure is required.

In the aforementioned embodiment, three operation modes of the first and second automatic modes and the manual mode are provided in the air pressure defining device 32, but only one of the above three modes can be provided or the combination of the first and second automatic modes, namely, an automatic operation mode combining feedforward control caused by the target value defining device 51 and feedback control based on data sent from the processing power detection device 20 and the processing load detection device 40 can be provided. That is to say, in the present invention, at least the air pressure regulating device 11 capable of regulating the pressure of air supplied to the air bearing during the processing operation may be provided, in which the concrete regulating method can be defined suitably when the process is carried out.

In the aforementioned embodiment, the pressure of air supplied to the air bearing 5 is controlled by using both of data of the processing load and the processing power, but the pressure can be controlled by using only data of the processing load.

The processing load detection means 40 is not intended to be limited to use the accelerometer 41, but various vibrometers, a pressure sensor, an AE (an acoustic emission) sensor and so on can be used. But, if the accelerometer 41 is used, there are advantages of a smaller size and easy attachmnent to the housing 6.

In the aforementioned embodiment, the pressure of air supplied to the air bearing 5 is changed at two stages of the high and low pressures, but the pressure can be changed at more than three stages. When the pressure is changed at the plural stages, the pressure of air supplied to the air bearing 5, or the rigidity of the bearing can be small controlled, so that the rigidity of the bearing can be suitably defined to respond to the processing load or the like, resulting in a saving of energy. Furthermore, it may be structured that the air pressure is not regulated at the plural stages but is regulated continuously.

As a concrete structure of the air bearing 5, the air bearing having three bearing members 71–73 as described in the aforementioned embodiment is not limited, and the bearing can be suitably selected in dependence on the operated process. For example, the thrust bearing is placed at a position adjacent to the side attached with the tool 2 in the aforementioned embodiment, but the thrust bearing can be placed at a position adjacent to the motor 4, and iurther, the bearing member may be suitably provided in dependence on the structure of the main shaft 3 or the like.

What is claimed is:

1. An air bearing type machine tool, comprising:
    a main shaft;
    an air bearing supporting said main shaft; and
    a air pressure regulating means for regulating pressure of air supplied to said air bearing, wherein said air pressure regulating means has an air pressure defining means for defining pressure of air applied to said air bearing in accordance with a degree of processing load to regulate the pressure of air supplied to said air bearing during processing operation.

2. The air bearing type machine tool according to claim 1, wherein said air pressure regulating means further has a processing load detection means for detecting the degree of processing load, and wherein said air pressure defining means defines the pressure of air supplied to said air bearing in response to the degree of processing load detected by said processing load detection means.

3. The air bearing type machine tool according to claim 2, wherein said air pressure regulating means has a processing power detection means for detecting the degree of processing power when said main shaft is rotated for processing, so that said air pressure defining means defines the pressure of air supplied to said air bearing based on the degree of load detected by said processing load detection means and the degree of power detected by said processing power detection means.

4. The air bearing type machine tool according to claim 1, wherein said air pressure regulating means has a target value defining means for previously defining a supplied air-pressure target value to coordinate with a process programming, and an air pressure defining means for defining pressure of air supplied said air bearing based on the target value defined by said target value defining means.

5. An air bearing type machine tool, comprising:

a main shaft;

an air bearing supporting said main shaft;

a motor rotating said main shaft;

a driving system driving said motor;

a numerical control system controlling said driving system; and an air feed portion supplying air to said air bearing, wherein said numerical control system being provided with an air pressure defining means for defining the pressure of air supplied from said air feed portion to said air bearing in accordance with a degree of processing load.

6. The air bearing type machine tool according to claim 5, further comprising a processing load detection means for finding the degree of processing load and outputting the degree of processing load to said numerical control systemn, so that said air pressure defining means defines the pressure of air supplied from said air feed portion to said air bearing based on the degree of processing load detected by said processing load detection means.

7. The air bearing type machine tool according to claim 6, further comprising a processing power detection means for finding the degree of processing power from data send from said driving system and outputting the degree of processing power to said numerical control system, so that said air pressure defining means defines the pressure of air supplied from said air feed portion to said air bearing based on the degree of processing load detected by said processing load detection means and the degree of processing power detected by said processing power detection means.

8. The air bearing type machine tool according to claim 5, wherein said numerical control system is provided with a target value defining means for previously defining a supplied air-pressure target value to coordinate with a process programming, so that said air pressure defining means defines the pressure of air supplied from said air feed portion to said air bearing based on the target value defined by said target value defining means.

9. The air bearing type machine tool according to claim 5, wherein said numerical control system is provided with a manual operation means for instructing the defined air pressure to said air pressure defining means with a manual operation.

10. The air bearing type machine tool according to claim 5, wherein said air feed portion is structured to feed air defined at a first pressure and at a second pressure lower than the first pressure.

11. The air bearing type machine tool according to claim 10, wherein said air feed portion has a first air source defined at said first pressure, a second air source defined at said second pressure, a pressure regulator regulating the pressure of air supplied from each air source to be at a specified value, a solenoid valve providing at a side providing said first air source to interrupt air fed from said first air source, and a check valve providing at a side providing said second air source to be closed by pressure caused when air is fed from said first air source by opening said solenoid valve and to be opened by pressure caused by said second air source itself when solenoid valve is closed.

* * * * *